April 16, 1957  K. WILFERT  2,788,998
ARRANGEMENT OF SIDE BUFFER STRIPS ON MOTOR VEHICLES
Filed July 3, 1952

Inventor
Karl Wilfert
By Wicke and Pedlow
Attorneys

United States Patent Office 2,788,998
Patented Apr. 16, 1957

2,788,998

ARRANGEMENT OF SIDE BUFFER STRIPS ON MOTOR VEHICLES

Karl Wilfert, Stuttgart-Degerloch, Germany, assignor to Daimler-Benz Aktiengesellschaft, Stuttgart-Unterturkheim, Germany Application July 3, 1952, Serial No. 297,150

Claims priority, application Germany July 7, 1951

6 Claims. (Cl. 293—62)

The present invention relates to an elastic arrangement of lateral buffer strips in motor vehicles.

An object of the invention is an arrangement of the buffer strips which yield softly and noiselessly.

Another object of the invention is an arrangement of the buffer strips which is favorable as regards space so that the buffer strips propect only slightly beyond the outline of the body.

Another object of the invention is the provision of a rigid guide means for the buffer strip with an appropriate yielding of the same.

A further object of the invention relates to an arrangement of the buffer strips at the vehicle so as to avoid as much as possible the transmission of the occurring impact forces to the shell of the body or to the doors, and to transmit as completely as possible the said forces to the frame or to the supporting structure of the body.

A further object of the invention provides a buffer strip mounting which requires no maintenance or lubrication, and which avoids jamming of the buffer strips.

It is a further object of the invention to use guides of rubber contributing simultaneously to the shock absorption owing to their elastic axial yielding characteristics.

Further objects and features of the present invention may be found from the following description when taken in connection with the accompanying drawing which shows for purposes of illustration only one preferred embodiment in accordance with the present invention, and wherein.

Figure 1:
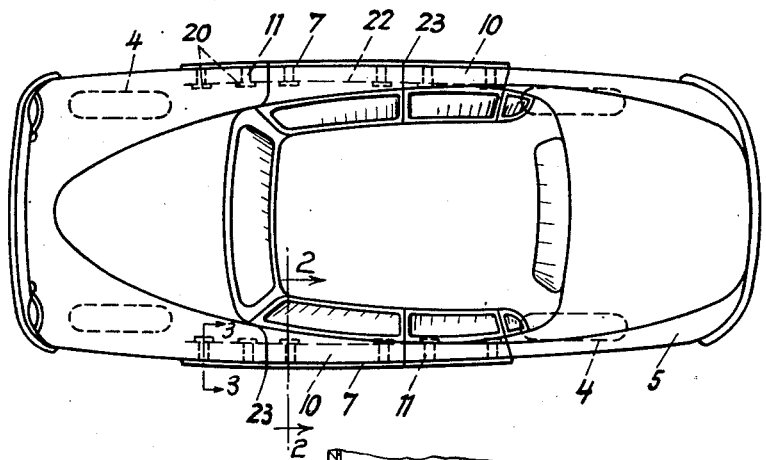
Fig. 1 is a plan view of a motor vehicle provided with the novel buffer strips.
Figure 2:
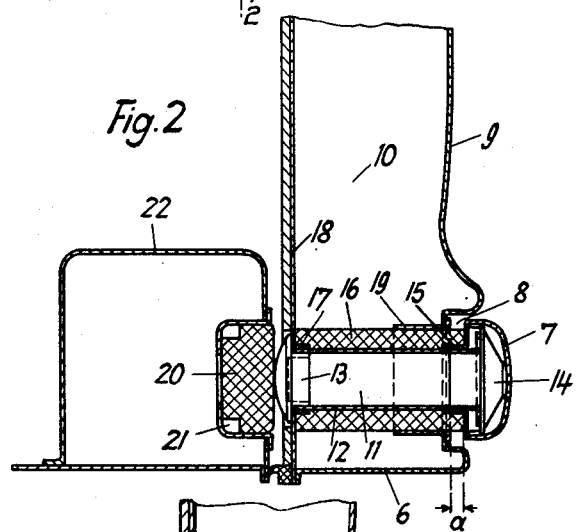
Fig. 2 is a sectional view through a guiding member of the buffer strip along line 2—2 of Fig. 1.
Figure 3:
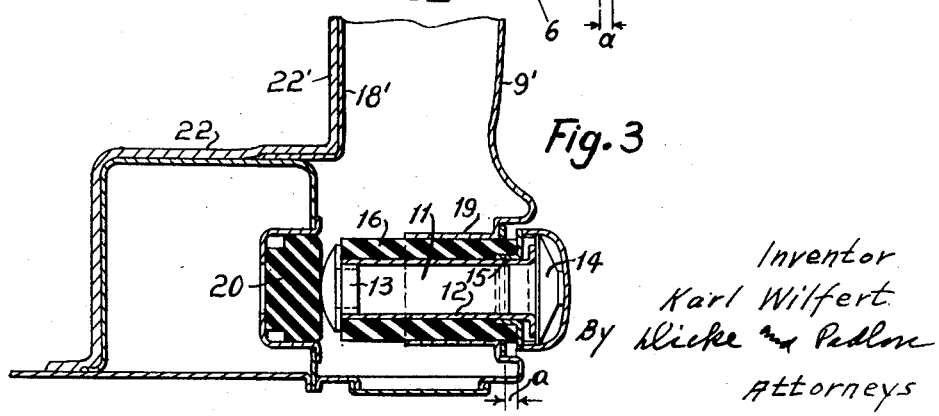
Fig. 3 is a sectional view through a guiding member of the buffer strip taken along line 3—3 of Figure 1.

The body 5, pontoon-like in its lower section, completely covering the road wheels 4 and forming the widest part of the vehicle is provided on either side of the vehicle with a buffer strip 7 arranged near the lower edge 6 and made of a drawn shape. The buffer strip projecting only slightly beyond the outline of the vehicle is arranged in a groove 8 provided in the lower bulged portion of the outside sheeting 9 forming the external wall of the vehicle side wall which is constituted in the embodiment of Figure 2 by the vehicle doors consisting of outer wall 9 and inner wall 18 extending downwardly and terminating at the lower edge and in Figure 3, for example, of outer wall 9' and inner wall 18' secured in any suitable manner to a corresponding portion 22' of the longitudinal girder 22, the latter being a part of the fixed bottom part of the vehicle.

Guiding plug members 11 are provided on the inner side of the buffer strip and extend transversely to the longitudinal direction of the vehicle. Each of these plug members 11 consist of a sleeve-like middle section, of an inner end part or head 13 and an outer end part or head 14, and each of these plug members 11 is attached to the flanges 15 of the shaped buffer strip 7, for instance, by welding. The guiding plug members 11 which are seated in rubber sleeves 16 have their inner ends directly mounted in a ring-shaped bearing collar 17 provided on the inner wall 18 of the door 10 of Figure 2. The outer ends of the plug members 11 are supported within the wider bearing collar 19 provided at the outer wall 9 of the door 10 or the outer wall 9' of the vehicle side wall by the interposition of the rubber sleeves 16 so that the plug members 11 may shift axially by an amount $a$ and may also yield otherwise slightly at the outer ends thereof. The sleeves 16 are made of relatively soft rubber so that they will not offer any considerable resistance to the axial displacement of the guiding plug members 11 as such resistance might otherwise cause deformations of the outer wall 9 or 9' and the inner wall 18 or 18', yet contribute effectively to the absorption of shocks.

The main part of the impacts on the buffer strip 7 transverse to the longitudinal direction of the vehicle is met by rubber buffer 20 arranged in recesses 21 of the bottom part or longitudinal girder 22 of the body, or of the chassis frame, and against which the guiding plug members 11 abut with their inner head parts 13. As a result, the lateral or side body parts of the vehicle and partly the vehicle doors are not impaired in their functioning even by stronger shocks or impacts hitting the buffer strip. It is a matter of course that the buffer strip must be disconnected at the door joints 23, so that each door only carries one part of the entire buffer strip corresponding to its width. At those places of the side wall where there are no doors or in those cases where the doors do not reach down to the lower edge of the body, the buffer strip is mounted on the fixed parts of the side walls in the same way as described above and as shown in Figure 3 which is a cross-sectional view through a portion of the vehicle side wall not forming part of the pivotal vehicle doors. In any case the described mounting of the buffer strip warrants a good accessibility and an easy replacing of all guiding and springing components, so that parts which may be damaged by stronger shocks may quickly be replaced.

The invention is not restricted to the illustrated example of design, but can at will be varied within the scope of its different ideas.

What I claim is:

1. In a motor vehicle a vehicle side wall with an external wall having a lower edge and provided with an inwardly directed groove near said edge, a fixed bottom part in said vehicle, a buffer strip located within said groove in said vehicle side wall with free play and extending only slightly beyond the outer surface of said external wall, a plurality of plug members secured to said buffer strip and directed inwardly, guiding means on said external wall retaining said plug members, and resilient buffer means on said fixed bottom part, said plug members extending through said vehicle side wall and abutting against said buffer means.

2. In a motor vehicle the combination according to claim 1, wherein said side wall includes an internal wall, and in which said guiding means comprises a bearing collar firmly connected to said external wall near the outer end of said plug member and a rubber sleeve encircling said plug member and fitted in said side wall between said buffer strip and said internal wall.

3. In a motor vehicle the combination according to claim 1, furthermore comprising a head at the inner end of said plug member and a head at the outer end of said plug member, the outer head being connected with said buffer strip, while the inner head abuts against said buffer means.

4. In a motor vehicle the combination according to claim 1, furthermore comprising a head at the inner end of said plug member and a head at the outer end of said plug member, the outer head being connected to said buffer strip, the inner head abutting against said buffer means, and wherein said guiding means comprises elastic means for mounting said plug members in said side wall to provide for elastic movement of said plug members with respect to said wall.

5. In a motor vehicle, the combination according to claim 1 in which said fixed bottom part comprises a bottom longitudinal girder extending beyond the inner side of said side wall of the vehicle and provided adjacent said side wall and at the height of said plug members with a longitudinally extending recess, and wherein said buffer means are located in said recess.

6. In a motor vehicle, the combination according to claim 1, wherein said vehicle side wall with said external wall forms part of a pivotal vehicle door, said fixed bottom part including a fixed bottom longitudinal girder, said buffer means being held on said longitudinal girder, while said plug members and said buffer strip are located in the lower part of said pivotal door within the inwardly directed groove thereof.

References Cited in the file of this patent

UNITED STATES PATENTS

| | | |
|---|---|---|
| 996,207 | Brown et al. | June 27, 1911 |
| 1,387,874 | Warner | Aug. 16, 1921 |
| 1,470,828 | Gorman | Oct. 16, 1923 |
| 1,810,717 | Lord | June 16, 1931 |
| 2,172,830 | Carlson | Sept. 12, 1939 |
| 2,329,808 | Wolfe | Sept. 21, 1943 |